(12) United States Patent
Reeves, Jr. et al.

(10) Patent No.: US 11,962,788 B2
(45) Date of Patent: Apr. 16, 2024

(54) DVCX AND DVCY EXTENSIONS TO DVC VIDEO COMPRESSION

(71) Applicant: Vertiv IT Systems, Inc., Huntsville, AL (US)

(72) Inventors: Haralson K. Reeves, Jr., Gadsden, AL (US); James C. McCormick, Jr., Madison, AL (US); John M. Phillips, Jr., Lighthouse Point, FL (US); G. Richard Goodley, II, Pompano Beach, FL (US)

(73) Assignee: VERTIV IT SYSTEMS, INC., Huntsville, AL (US)

( * ) Notice: Subject to any disclaimer, the term of this patent is extended or adjusted under 35 U.S.C. 154(b) by 0 days.

(21) Appl. No.: 17/880,060

(22) Filed: Aug. 3, 2022

(65) Prior Publication Data
US 2023/0045351 A1    Feb. 9, 2023

Related U.S. Application Data

(60) Provisional application No. 63/228,823, filed on Aug. 3, 2021.

(51) Int. Cl.
*H04N 19/186* (2014.01)
*H04N 19/182* (2014.01)
*H04N 19/184* (2014.01)
*H04N 19/70* (2014.01)

(52) U.S. Cl.
CPC ......... *H04N 19/186* (2014.11); *H04N 19/182* (2014.11); *H04N 19/184* (2014.11); *H04N 19/70* (2014.11)

(58) Field of Classification Search
CPC .. H04N 19/105; H04N 19/182; H04N 19/184; H04N 19/186; H04N 19/593; H04N 19/70
See application file for complete search history.

(56) References Cited

U.S. PATENT DOCUMENTS

| | | |
|---|---|---|
| 7,006,700 B2 | 2/2006 | Gilgen |
| 7,272,180 B2 | 9/2007 | Dambrackas |
| 7,321,623 B2 | 1/2008 | Dambrackas |
| 7,336,839 B2 | 2/2008 | Gilgen |

(Continued)

FOREIGN PATENT DOCUMENTS

EP    1197917 A2 *    4/2002    ........... G06T 11/001

*Primary Examiner* — Mainul Hasan
(74) *Attorney, Agent, or Firm* — Suiter Swantz IP

(57) ABSTRACT

A video compression method may include providing and transmitting encoder commands for sequences of one or more pixels in a video frame in a YCbCr color space from a set of hierarchal encoder commands. A particular encoder command for a particular sequence may include on of a copy command, a delta command, or a make pixel command. A copy command may indicate that the particular sequence is identical to one of a previous pixel in the video frame, a pixel located above a first pixel of the particular sequence in the video frame, or a pixel in a previous video frame at a location of the first pixel. A delta command may indicate that the particular sequence includes a single pixel with color values equal to the previous pixel in the video frame combined with a signed color delta. A make pixel command may provide color values of particular sequence.

25 Claims, 12 Drawing Sheets

(56) References Cited

U.S. PATENT DOCUMENTS

| | | |
|---|---|---|
| 7,457,461 B2 | 11/2008 | Gilgen |
| 7,515,632 B2 | 4/2009 | Dambrackas |
| 7,515,633 B2 | 4/2009 | Dambrackas |
| 7,542,509 B2 | 6/2009 | Dambrackas |
| 7,720,146 B2 | 5/2010 | Dambrackas |
| 7,738,553 B2 | 6/2010 | Dambrackas |
| 7,782,961 B2 | 8/2010 | Shelton et al. |
| 7,809,058 B2 | 10/2010 | Dambrackas |
| 8,385,429 B2 | 2/2013 | Dambrackas et al. |
| 8,457,195 B2 | 6/2013 | Dambrackas |
| 8,660,194 B2 | 2/2014 | Shelton et al. |
| 8,805,096 B2 | 8/2014 | Gilgen |
| 9,008,191 B2 | 4/2015 | Dambrackas et al. |
| 9,743,095 B2 | 8/2017 | Dambrackas |
| 2004/0062305 A1* | 4/2004 | Dambrackas ........ H04N 19/593 375/E7.178 |
| 2007/0247650 A1* | 10/2007 | Nakami ............... H04N 1/6083 358/1.9 |
| 2007/0253492 A1* | 11/2007 | Shelton ............... H04N 19/182 375/240.26 |
| 2007/0274382 A1* | 11/2007 | Hickey ................ H04N 19/98 375/240.03 |
| 2012/0106650 A1* | 5/2012 | Siegman ............. H04N 19/507 375/E7.2 |

\* cited by examiner

| BYTE 0 | 0 | 1 | 2 | 3 | 4 | 5 | 6 | 7 |
|---|---|---|---|---|---|---|---|---|
| | P | P | P | P | H | H | H | H |

FIG. 1

| Comp Type | Mnemonic | Command | Bytes | Byte 0 |||||||||| Byte 1 ||||||||
|---|---|---|---|---|---|---|---|---|---|---|---|---|---|---|---|---|---|---|---|
| | | | | 7 | 6 | 5 | 4 | 3 | 2 | 1 | 0 | 7 | 6 | 5 | 4 | 3 | 2 | 1 | 0 |
| DVC 23X | CO | Copy Old | 1 | 0 | 0 | 0 | 0 | $C_3$ | $C_2$ | $C_1$ | $C_0$ | | | | | | | | |
| | CL | Copy Left | 1 | 0 | 0 | 1 | 0 | $C_3$ | $C_2$ | $C_1$ | $C_0$ | | | | | | | | |
| | CA | Copy Above | 1 | 0 | 1 | 0 | 0 | $C_3$ | $C_2$ | $C_1$ | $C_0$ | | | | | | | | |
| | DUCL | Delta Uniform Copy Left | 1 | 0 | 1 | 1 | 0 | $D_3$ | $D_2$ | $D_1$ | $D_0$ | | | | | | | | |
| | DUCA | Delta Uniform Copy Above | 1 | 0 | 1 | 1 | 1 | $D_3$ | $D_2$ | $D_1$ | $D_0$ | | | | | | | | |
| | DCO | Delta Copy Old | 2 | 0 | 0 | 0 | 1 | $DR_3$ | $DR_2$ | $DR_1$ | $DR_0$ | $DG_3$ | $DG_2$ | $DG_1$ | $DG_0$ | $DB_3$ | $DB_2$ | $DB_1$ | $DB_0$ |
| | DCL | Delta Copy Left | 2 | 0 | 0 | 1 | 1 | $DR_3$ | $DR_2$ | $DR_1$ | $DR_0$ | $DG_3$ | $DG_2$ | $DG_1$ | $DG_0$ | $DB_3$ | $DB_2$ | $DB_1$ | $DB_0$ |
| | DCA | Delta Copy Above | 2 | 0 | 1 | 0 | 1 | $DR_3$ | $DR_2$ | $DR_1$ | $DR_0$ | $DG_3$ | $DG_2$ | $DG_1$ | $DG_0$ | $DB_3$ | $DB_2$ | $DB_1$ | $DB_0$ |
| | MP23 | Make Pixel 23-bit | 3 | 1 | $R_7$ | $R_6$ | $R_5$ | $R_4$ | $R_3$ | $R_2$ | $R_1$ | $R_0$ | $G_7$ | $G_6$ | $G_5$ | $G_4$ | $G_3$ | $G_2$ | $G_1$ |

FIG. 2

| Comp Type | Mnemonic | \multicolumn{8}{c}{Encoding Byte 2} | Notes |
|---|---|---|---|---|---|---|---|---|---|---|
| | | 7 | 6 | 5 | 4 | 3 | 2 | 1 | 0 | |
| DVC 23X | CO | | | | | | | | | Successive bytes extend the count, max count is 7 bytes (25 bits) |
| | CL | | | | | | | | | Successive bytes extend the count, max count is 7 bytes (25 bits) |
| | CA | | | | | | | | | Successive bytes extend the count, max count is 7 bytes (25 bits) |
| | DUCL | | | | | | | | | Delta range is -8 to +7, applied uniformly |
| | DUCA | | | | | | | | | Delta range is -8 to +7, applied uniformly |
| | DCO | | | | | | | | | Delta range is -8 to +7, applied individually |
| | DCL | | | | | | | | | Delta range is -8 to +7, applied individually |
| | DCA | | | | | | | | | Delta range is -8 to +7, applied individually |
| | MP23 | $G_0$ | $B_7$ | $B_6$ | $B_5$ | $B_4$ | $B_3$ | $B_2$ | $B_1$ | RGB 8:8:7 |

FIG. 2 Cont.

| Comp Type | Mnemonic | Command | Bytes | Byte 0 | | | | | | | | Byte 1 | | | | | | | |
|---|---|---|---|---|---|---|---|---|---|---|---|---|---|---|---|---|---|---|---|
| | | | | 7 | 6 | 5 | 4 | 3 | 2 | 1 | 0 | 7 | 6 | 5 | 4 | 3 | 2 | 1 | 0 |
| DVC23Y2 YCbCr | CO | Copy Old | 1 | 0 | 0 | 0 | 0 | C₄ | C₃ | C₂ | C₁ | | | | | | | | |
| | CL | Copy Left | 1 | 0 | 0 | 0 | 1 | C₄ | C₃ | C₂ | C₁ | | | | | | | | |
| | CA | Copy Above | 1 | 0 | 0 | 1 | 0 | C₄ | C₃ | C₂ | C₁ | | | | | | | | |
| | DUCL | Delta Uniform Copy Left | 2 | 0 | 1 | 1 | 0 | D₃ | D₂ | D₁ | D₀ | Y1₇ | Y1₆ | Y1₅ | Y1₄ | Y1₃ | Y1₂ | Y1₁ | Y1₀ |
| | DUCA | Delta Uniform Copy Above | 2 | 0 | 1 | 1 | 1 | D₃ | D₂ | D₁ | D₀ | Y1₇ | Y1₆ | Y1₅ | Y1₄ | Y1₃ | Y1₂ | Y1₁ | Y1₀ |
| | DCO | Delta Copy Old | 3 | 0 | 0 | 1 | 1 | DY₃ | DY₂ | DY₁ | DY₀ | DCr₃ | DCr₂ | DCr₁ | DCr₀ | DCb₃ | DCb₂ | DCb₁ | DCb₀ |
| | DCL | Delta Copy Left | 3 | 0 | 0 | 0 | 1 | DY₃ | DY₂ | DY₁ | DY₀ | DCr₃ | DCr₂ | DCr₁ | DCr₀ | DCb₃ | DCb₂ | DCb₁ | DCb₀ |
| | DCA | Delta Copy Above | 3 | 0 | 0 | 1 | 1 | DY₃ | DY₂ | DY₁ | DY₀ | DCr₃ | DCr₂ | DCr₁ | DCr₀ | DCb₃ | DCb₂ | DCb₁ | DCb₀ |
| | MP23ev | Make Pixel 23-bit | 4 | 1 | Y0₇ | Y0₆ | Y0₅ | Y0₄ | Y0₃ | Y0₂ | Y0₁ | Y0₀ | Cr₇ | Cr₆ | Cr₅ | Cr₄ | Cr₃ | Cr₂ | Cr₁ |

\* *All counts are by 2 (bit 0 redacted) since all DVC23Y2 commands are minimum 2 pixels*

FIG. 3

| Comp Type | Mnemonic | Byte 2 7 | 6 | 5 | 4 | 3 | 2 | 1 | 0 | Byte 3 7 | 6 | 5 | 4 | 3 | 2 | 1 | 0 | Notes |
|---|---|---|---|---|---|---|---|---|---|---|---|---|---|---|---|---|---|---|
| | CO | | | | | | | | | | | | | | | | | Successive bytes extend the count, max count is 7 bytes (25 bits) |
| | CL | | | | | | | | | | | | | | | | | Successive bytes extend the count, max count is 7 bytes (25 bits) |
| | CA | | | | | | | | | | | | | | | | | Successive bytes extend the count, max count is 7 bytes (25 bits) |
| | DUCL | | | | | | | | | | | | | | | | | Delta range is -8 to +7, applied uniformly |
| DVC23Y2 YCbCr | DUCA | | | | | | | | | | | | | | | | | Delta range is -8 to +7, applied uniformly |
| | DCO | $Y1_7$ | $Y1_6$ | $Y1_5$ | $Y1_4$ | $Y1_3$ | $Y1_2$ | $Y1_1$ | $Y1_0$ | | | | | | | | | Delta range is -8 to +7, applied individually |
| | DCL | $Y1_7$ | $Y1_6$ | $Y1_5$ | $Y1_4$ | $Y1_3$ | $Y1_2$ | $Y1_1$ | $Y1_0$ | | | | | | | | | Delta range is -8 to +7, applied individually |
| | DCA | $Y1_7$ | $Y1_6$ | $Y1_5$ | $Y1_4$ | $Y1_3$ | $Y1_2$ | $Y1_1$ | $Y1_0$ | | | | | | | | | Delta range is -8 to +7, applied individually |
| | MP23 | $Cr_0$ | $Cb_7$ | $Cb_6$ | $Cb_5$ | $Cb_4$ | $Cb_3$ | $Cb_2$ | $Cb_1$ | $Y1_7$ | $Y1_6$ | $Y1_5$ | $Y1_4$ | $Y1_3$ | $Y1_2$ | $Y1_1$ | $Y1_0$ | $Y_8Cr_8Cb_7Y_8$ (2 pixels) [4:2:2 - even column pixels all lines] |

FIG. 3 Cont.

| Comp Type | Mnemonic | Command | Bytes | Byte 0 |||||||| Byte 1 ||||||||
|---|---|---|---|---|---|---|---|---|---|---|---|---|---|---|---|---|---|---|---|
| | | | | 7 | 6 | 5 | 4 | 3 | 2 | 1 | 0 | 7 | 6 | 5 | 4 | 3 | 2 | 1 | 0 |
| DVC23Y YCbCr | CO | Copy Old | 1 | 0 | 0 | 0 | 0 | $C_3$ | $C_2$ | $C_1$ | $C_0$ | | | | | | | | |
| | CL | Copy Left | 1 | 0 | 0 | 1 | 0 | $C_3$ | $C_2$ | $C_1$ | $C_0$ | | | | | | | | |
| | CA | Copy Above | 1 | 0 | 1 | 0 | 0 | $C_3$ | $C_2$ | $C_1$ | $C_0$ | | | | | | | | |
| | DUCL | Delta Uniform Copy Left | 1 | 0 | 1 | 1 | 0 | $D_3$ | $D_2$ | $D_1$ | $D_0$ | | | | | | | | |
| | DUCA | Delta Uniform Copy Above | 1 | 0 | 0 | 1 | 1 | $D_3$ | $D_2$ | $D_1$ | $D_0$ | | | | | | | | |
| | DCO | Delta Copy Old | 2 | 0 | 0 | 0 | 1 | $DY_3$ | $DY_2$ | $DY_1$ | $DY_0$ | $DCr_3$ | $DCr_2$ | $DCr_1$ | $DCr_0$ | $DCb_3$ | $DCb_2$ | $DCb_1$ | $DCb_0$ |
| | DCL | Delta Copy Left | 2 | 0 | 0 | 1 | 1 | $DY_3$ | $DY_2$ | $DY_1$ | $DY_0$ | $DCr_3$ | $DCr_2$ | $DCr_1$ | $DCr_0$ | $DCb_3$ | $DCb_2$ | $DCb_1$ | $DCb_0$ |
| | DCA | Delta Copy Above | 2 | 0 | 1 | 0 | 1 | $DY_3$ | $DY_2$ | $DY_1$ | $DY_0$ | $DCr_3$ | $DCr_2$ | $DCr_1$ | $DCr_0$ | $DCb_3$ | $DCb_2$ | $DCb_1$ | $DCb_0$ |
| | MP23ev | Make Pixel 23-bit | 4 | 1 | $Y0_7$ | $Y0_6$ | $Y0_5$ | $Y0_4$ | $Y0_3$ | $Y0_2$ | $Y0_1$ | $Y0_0$ | $Cr_7$ | $Cr_6$ | $Cr_5$ | $Cr_4$ | $Cr_3$ | $Cr_2$ | $Cr_1$ |
| | MP23od | Make Pixel 23-bit | 1 | 1 | $Y1_7$ | $Y1_6$ | $Y1_5$ | $Y1_4$ | $Y1_3$ | $Y1_2$ | $Y1_1$ | | | | | | | |

FIG. 4

| Comp Type | Mnemonic | Encoding Byte 2 | | | | | | | | Encoding Byte 3 | | | | | | | | Notes |
|---|---|---|---|---|---|---|---|---|---|---|---|---|---|---|---|---|---|---|
| | | 7 | 6 | 5 | 4 | 3 | 2 | 1 | 0 | 7 | 6 | 5 | 4 | 3 | 2 | 1 | 0 | |
| DVC23Y YCbCr | CO | | | | | | | | | | | | | | | | | Successive bytes extend the count, max count is 7 bytes (25 bits) |
| | CL | | | | | | | | | | | | | | | | | Successive bytes extend the count, max count is 7 bytes (25 bits) |
| | CA | | | | | | | | | | | | | | | | | Successive bytes extend the count, max count is 7 bytes (25 bits) |
| | DUCL | | | | | | | | | | | | | | | | | Delta range is -8 to +7, applied uniformly |
| | DUCA | | | | | | | | | | | | | | | | | Delta range is -8 to +7, applied uniformly |
| | DCO | | | | | | | | | | | | | | | | | Delta range is -8 to +7, applied individually |
| | DCL | | | | | | | | | | | | | | | | | Delta range is -8 to +7, applied individually |
| | DCA | | | | | | | | | | | | | | | | | Delta range is -8 to +7, applied individually |
| | MP23ev | $Cr_0$ | $Cb_7$ | $Cb_6$ | $Cb_5$ | $Cb_4$ | $Cb_3$ | $Cb_2$ | $Cb_1$ | $Y1_7$ | $Y1_6$ | $Y1_5$ | $Y1_4$ | $Y1_3$ | $Y1_2$ | $Y1_1$ | $Y1_0$ | $Y_8Cr_8Cb_7Y_8$ (2 pixels) [4:2:2 - even column pixels] |
| | MP23od | | | | | | | | | | | | | | | | | $Y_7$ [4:2:2 - odd column pixels] |

FIG. 4 Cont.

| Comp Type | Mnemonic | Command | Bytes | Byte 0 | | | | | | | | Byte 1 | | | | | | | |
|---|---|---|---|---|---|---|---|---|---|---|---|---|---|---|---|---|---|---|---|
| | | | | 7 | 6 | 5 | 4 | 3 | 2 | 1 | 0 | 7 | 6 | 5 | 4 | 3 | 2 | 1 | 0 |
| DVC29Y YCbCr | CO | Copy Old | 1 | 0 | 0 | 0 | 0 | $C_3$ | $C_2$ | $C_1$ | $C_0$ | | | | | | | | |
| | CL | Copy Left | 1 | 0 | 0 | 1 | 0 | $C_3$ | $C_2$ | $C_1$ | $C_0$ | | | | | | | | |
| | CA | Copy Above | 1 | 0 | 1 | 0 | 0 | $C_3$ | $C_2$ | $C_1$ | $C_0$ | | | | | | | | |
| | DUCL | Delta Uniform Copy Left | 1 | 0 | 1 | 1 | 0 | $D_3$ | $D_2$ | $D_1$ | $D_0$ | | | | | | | | |
| | DUCA | Delta Uniform Copy Above | 1 | 0 | 1 | 1 | 1 | $D_3$ | $D_2$ | $D_1$ | $D_0$ | | | | | | | | |
| | DCO | Delta Copy Old | 2 | 0 | 0 | 0 | 1 | $DY_3$ | $DY_2$ | $DY_1$ | $DY_0$ | $DCr_3$ | $DCr_2$ | $DCr_1$ | $DCr_0$ | $DCb_3$ | $DCb_2$ | $DCb_1$ | $DCb_0$ |
| | DCL | Delta Copy Left | 2 | 0 | 0 | 1 | 1 | $DY_3$ | $DY_2$ | $DY_1$ | $DY_0$ | $DCr_3$ | $DCr_2$ | $DCr_1$ | $DCr_0$ | $DCb_3$ | $DCb_2$ | $DCb_1$ | $DCb_0$ |
| | DCA | Delta Copy Above | 2 | 0 | 0 | 0 | 1 | $DY_3$ | $DY_2$ | $DY_1$ | $DY_0$ | $DCr_3$ | $DCr_2$ | $DCr_1$ | $DCr_0$ | $DCb_3$ | $DCb_2$ | $DCb_1$ | $DCb_0$ |
| | MP30ev | Make Pixel 30-bit | 5 | 1 | $YO_9$ | $YO_8$ | $YO_7$ | $YO_6$ | $YO_5$ | $YO_4$ | $YO_3$ | $YO_2$ | $YO_1$ | $YO_0$ | $Cr_9$ | $Cr_8$ | $Cr_7$ | $Cr_6$ | $Cr_5$ |
| | MP30od | Make Pixel 30-bit | 2 | 1 | 0 | n | n | n | n | $YO_9$ | $YO_8$ | $YO_7$ | $YO_6$ | $YO_5$ | $YO_4$ | $YO_3$ | $YO_2$ | $YO_1$ | $YO_0$ |

* n --> indicates null bits

FIG. 5

| Comp Type | Mnemonic | Byte 2 (Encoding) | | | | | | | | Byte 3 | | | | | | | |
|---|---|---|---|---|---|---|---|---|---|---|---|---|---|---|---|---|---|
| | | 7 | 6 | 5 | 4 | 3 | 2 | 1 | 0 | 7 | 6 | 5 | 4 | 3 | 2 | 1 | 0 |
| DVC29Y YCbCr | CO | | | | | | | | | | | | | | | | |
| | CL | | | | | | | | | | | | | | | | |
| | CA | | | | | | | | | | | | | | | | |
| | DUCL | | | | | | | | | | | | | | | | |
| | DUCA | | | | | | | | | | | | | | | | |
| | DCO | | | | | | | | | | | | | | | | |
| | DCL | | | | | | | | | | | | | | | | |
| | DCA | | | | | | | | | | | | | | | | |
| | MP30ev | $Cr_4$ | $Cr_3$ | $Cr_2$ | $Cr_1$ | $Cr_0$ | $Cb_9$ | $Cb_8$ | $Cb_7$ | $Cb_6$ | $Cb_5$ | $Cb_4$ | $Cb_3$ | $Cb_2$ | $Cb_1$ | $Y1_9$ | $Y1_8$ |
| | MP30od | | | | | | | | | | | | | | | | |

FIG.5 Cont.

| Comp Type | Mnemonic | Encoding Byte 4 | | | | | | | | Notes |
|---|---|---|---|---|---|---|---|---|---|---|
| | | 7 | 6 | 5 | 4 | 3 | 2 | 1 | 0 | |
| DVC29Y YCbCr | CO | | | | | | | | | Successive bytes extend the count, max count is 7 bytes (25 bits) |
| | CL | | | | | | | | | Successive bytes extend the count, max count is 7 bytes (25 bits) |
| | CA | | | | | | | | | Successive bytes extend the count, max count is 7 bytes (25 bits) |
| | DUCL | | | | | | | | | Delta range is -8 to +7, applied uniformly |
| | DUCA | | | | | | | | | Delta range is -8 to +7, applied uniformly |
| | DCO | | | | | | | | | Delta range is -8 to +7, applied individually |
| | DCL | | | | | | | | | Delta range is -8 to +7, applied individually |
| | DCA | | | | | | | | | Delta range is -8 to +7, applied individually |
| | MP30ev | $Y1_7$ | $Y1_6$ | $Y1_5$ | $Y1_4$ | $Y1_3$ | $Y1_2$ | $Y1_1$ | $Y1_0$ | $Y1_{10}Cr_{10}Cr_9Y_{10}$ (2 pixels) [4:2:2 - even column pixels all lines] |
| | MP30od | | | | | | | | | $Y_{10}$ [4:2:2 - odd column pixels] |

FIG. 5 Cont.

| Mnemonic | Command | Description |
|---|---|---|
| CO | Copy Old | Copy the pixel from the same X/Y position in the previous frame for the prescribed run count. |
| CL | Copy Left | Copy the pixel from the (X-1)/Y position of the current frame for the prescribed run count. |
| CA | Copy Above | Copy the pixel from the X/(Y-1) position of the current frame for the prescribed run count. |
| DUCL | Delta Uniform Copy Left | Add or subtract (signed math) the single supplied component from all color components of the pixel at the (X-1)/Y position of the current frame for a run of 1 or 2 pixels (2 for DVC23Y2) |
| DUCA | Delta Uniform Copy Above | Add or subtract (signed math) the single supplied component from all color components of the pixel at the X/(Y-1) position of the current frame for a run of 1 or 2 pixels (2 for DVC23Y2) |
| DCO | Delta Copy Old | Add or subtract (signed math) the 3 supplied components from the respective color components of the pixel at the X/Y position in the prevous frame for a run of 1 or 2 pixels (2 for DVC23Y2) |
| DCL | Delta Copy Left | Add or subtract (signed math) the 3 supplied components from the respective color components of the pixel at the (X-1 )/Y position of the current frame for a run of 1 or 2 pixels (2 for DVC23Y2) |
| DCA | Delta Copy Above | Add or subtract (signed math) the 3 supplied components from the respective color components of the pixel at the X/(Y -1) position of the current frame for a run of 1 or 2 pixels (2 for DVC23Y2) |
| MP | Make Pixel | Prescribes the exact color components for the pixel in a given color depth. 1 pixel command for RGB. 1 or 2 pixel Command for YCbCr based on X position of pixel - exen = 2 pixel, odd = 1 pixel |

FIG.6

DVCX AND DVCY EXTENSIONS TO DVC VIDEO COMPRESSION

CROSS-REFERENCE TO RELATED APPLICATION

The present application claims the benefit under 35 U.S.C. § 119(e) of U.S. Provisional Application Ser. No. 63/228,823, filed Aug. 3, 2021 entitled DVCX AND DVCY EXTENSIONS TO DVC VIDEO COMPRESSION, naming HARALSON K. REEVES JR., JAMES C. MCCORMICK JR., JOHN M. PHILLIPS JR., and G. RICHARD GOODLEY II as inventors, which is incorporated herein by reference in the entirety.

TECHNICAL FIELD

The present disclosure relates generally to video compression and, more particularly, to video compression using DVC encoding techniques.

BACKGROUND

Video compression systems may compress a video stream (e.g., a series of video frames) and are particularly useful for, but are not limited to, transmission of the video stream across a communication channel. Various video compression techniques have been developed that utilize different strategies and employ different tradeoffs, and different applications may have different requirements. For example, many interactive applications may prioritize image quality and low latency (e.g., real-time) transmissions and may accept a certain amount of discontinuity in the video stream to meet these requirements. However, existing compression technologies are insufficient to meet increasing demands for high-resolution video with minimal loss and low latency. There is therefore a need to develop systems and methods to cure the above deficiencies.

SUMMARY

A video compression system is disclosed in accordance with one or more illustrative embodiments. In one illustrative embodiment, the system includes a controller to at least one of send or receive a compressed video stream based on encoder commands for sequences of one or more pixels in a video frame from a set of hierarchal encoder commands, where the video frame is provided in a YCbCr color space. In another illustrative embodiment, a particular encoder command for a particular sequence of one or more pixels includes one of a copy command indicating that the particular sequence of one or more pixels is identical to one of a previous pixel in the video frame, a pixel located above a first pixel in the particular sequence in the video frame, or a pixel in a previous video frame at a location of the first pixel in the particular sequence. In another illustrative embodiment, a particular encoder command for a particular sequence of one or more pixels includes a delta command indicating that the particular sequence includes a single pixel with color values equal to the previous pixel in the video frame combined with a signed color delta. In another illustrative embodiment, a particular encoder command for a particular sequence of one or more pixels includes a make pixel command providing color values of particular sequence.

A video compression method is disclosed in accordance with one or more illustrative embodiments. In one illustrative embodiment, the method includes providing encoder commands for sequences of one or more pixels in a video frame from a set of hierarchal encoder commands, where the video frame is provided in a YCbCr color space. In another illustrative embodiment, a particular encoder command for a particular sequence of one or more pixels includes one of a copy command indicating that the particular sequence of one or more pixels is identical to one of a previous pixel in the video frame, a pixel located above a first pixel in the particular sequence in the video frame, or a pixel in a previous video frame at a location of the first pixel in the particular sequence. In another illustrative embodiment, a particular encoder command for a particular sequence of one or more pixels includes a delta command indicating that the particular sequence includes a single pixel with color values equal to the previous pixel in the video frame combined with a signed color delta. In another illustrative embodiment, a particular encoder command for a particular sequence of one or more pixels includes a make pixel command providing color values of particular sequence. In another illustrative embodiment, the method includes transmitting the encoder commands for each of the sequences of one or more pixels in the video frame over a communication channel upon generation.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures.

FIG. 1 is a conceptual view of a leading (or only) byte of an encoder command with at least one header bit and payload bits, in accordance with one or more embodiments of the present disclosure.

FIG. 2 is a table including commands for a first command set DVC23X listed in order of hierarchal priority, in accordance with one or more embodiments of the present disclosure.

FIG. 3 is a table including commands for a second command set DVC23Y2 listed in order of hierarchal priority, in accordance with one or more embodiments of the present disclosure.

FIG. 4 is a table including commands for a third command set DVC23Y listed in order of hierarchal priority, in accordance with one or more embodiments of the present disclosure.

FIG. 5 is a table including commands for a fourth command set DVC29Y listed in order of hierarchal priority, in accordance with one or more embodiments of the present disclosure.

FIG. 6 includes a summary of the encoder commands for the four DVC command sets in FIGS. 2-5, in accordance with one or more embodiments of the present disclosure.

DETAILED DESCRIPTION

Figure 7:
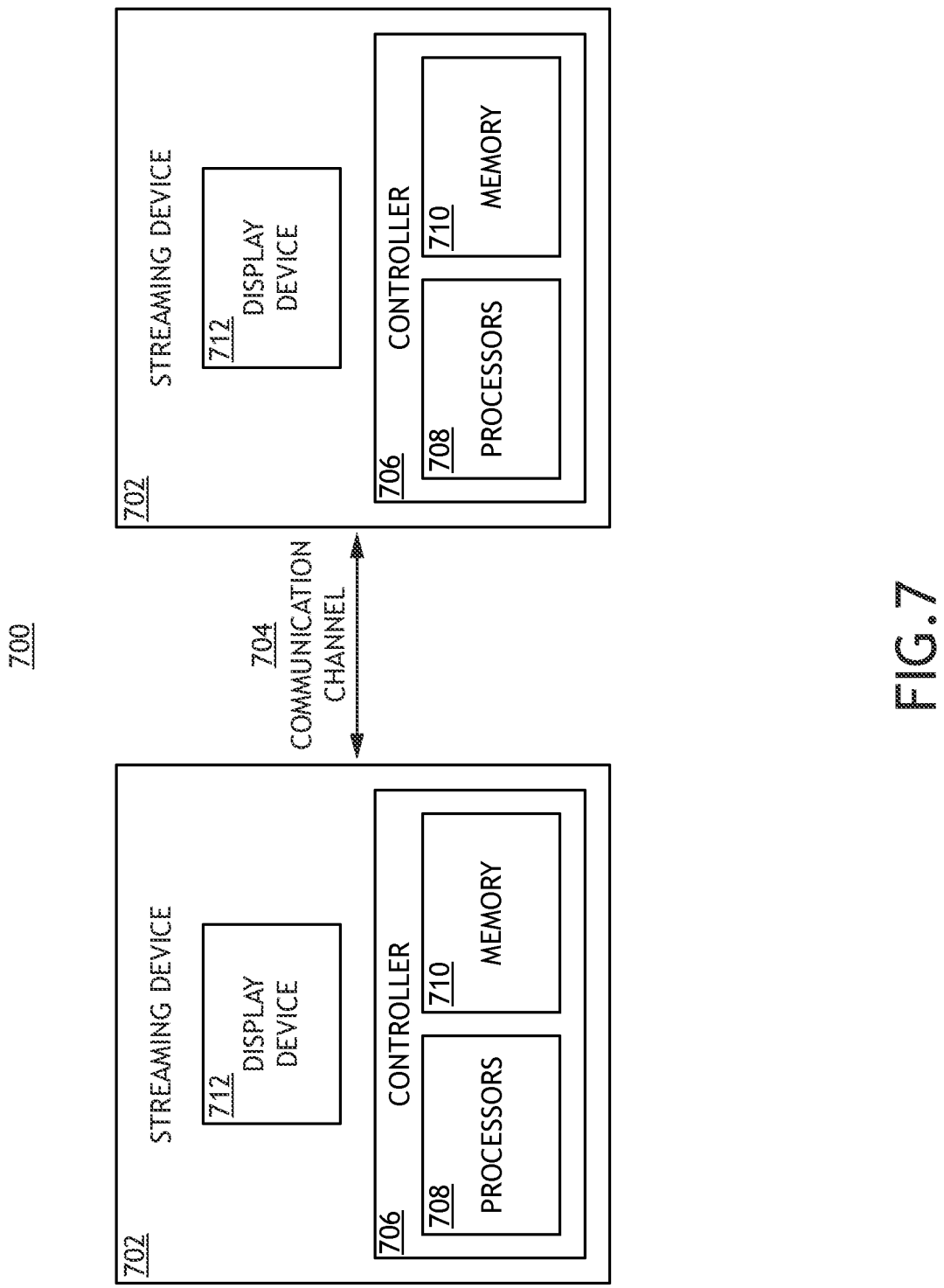
FIG. 7 is a block diagram view of a system for streaming compressed video, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to extensions and/or modifications of DVC video compression techniques to support the YCbCr color space as well as improved performance in the RGB color space.

DVC compression is generally described in U.S. Pat. Nos. 7,321,623, 7,272,180, 7,738,553, 7,542,509, 7,515,632, 7,515,633, 8,385,429, 7,809,058, 7,720,146, 8,457,195, 9,008,191, 9,743,095, 7,006,700, 7,336,839, 7,457,461, and 8,805,096, all of which are incorporated herein by reference in their entirety. These U.S. Patents generally describe DVC compression as a framework for lossless video compression suitable for transmission across a network link of any type. In DVC compression, pixels of a video frame to be compressed may be considered sequentially in a selected pattern such as, but not limited to, starting from an upper left corner of the frame to a bottom right corner of the frame. As the pixels of the frame are analyzed according to the sequence, encoding commands describing the content of one or more pixels are generated and sent across the link for decoding. One aspect of DVC compression is that both sides of the link have some reference information such that the encoding commands may provide information about one or more pixels based on this reference information. For example, reference information associated with a current pixel in the sequence may include, but is not limited to, a previous pixel in the sequence, an adjacent pixel in an adjacent row (e.g., a pixel immediately above the current pixel in the frame), or a pixel in the same location of the previous frame.

As an illustration, a current pixel in the sequence may be defined to have the same properties as the same pixel in the previous frame (COPY_OLD (CO)), the same as the previous pixel (COPY_LEFT (CL)), or the same as the pixel above (COPY_ABOVE (CA)). In this way, an encoding command (e.g., COPY_OLD (CO), COPY_LEFT (CL), COPY_ABOVE (CA), or the like) may be sent across the link to describe a current pixel in the sequence based on one of these references, where the encoding command may require fewer bytes of data to be sent over the link than a full description of the pixel (e.g., color values associated with a selected color space). In cases where the current pixel is unrelated to any of the references, an encoding command including the complete color values of the current pixel may be sent (MAKE_PIXEL (MP)). As a result, the sequence of encoding commands may represent a lossless version of the video frame that may be easily decoded at the receiving end of the link. Further, as long as at least one pixel is characterized by an encoding command other than a MAKE_PIXEL (MP) command, the sequence of encoding commands will be a compressed video stream.

The DVC compression technique may further include various aspects that may further increase performance by increasing the compression ratio, decreasing the processing power or for decoding, or the like. For example, an encoding command may include a sequence of bytes (e.g., a command) describing a number of identical sequential pixels in the frame. In this way, a single encoding command (e.g., COPY_OLD (CO), COPY_LEFT (CL), COPY_ABOVE (CA), MAKE_PIXEL (MP), or the like) may describe multiple sequential pixels, which may substantially increase the compression ratio. By way of another example, the set of encoding commands in a particular implementation of DVC compression may be arranged in a hierarchal order of priority. Accordingly, if two or more encoding commands are applicable to a current pixel or series of pixels including the current pixel, then the encoding command with the highest priority may be selected.

The hierarchy may generally be determined by any selected constraints or performance goals. As an illustration, the above encoding commands may be, but are not required to be, arranged in the following order of priority: COPY_OLD (CO), COPY_LEFT (CL), COPY_ABOVE (CA), MAKE_PIXEL (MP). It is contemplated herein that the COPY_OLD (CO) command may require the least burden on the receiving end of the link since it simply skips any operations on the current pixel and leaves the pixel from the previous frame. The COPY_LEFT (CL) may be the next priority since it only requires copying an adjacent pixel. It is further contemplated herein that MAKE_PIXEL (MP) is typically the lowest priority since it requires sending full color values and is thus uncompressed. However, it is to be understood that the above example is provided solely for illustrative purposes and that any particular implementation of DVC compression may generally employ any suitable hierarchal order of priority for constituent encoding commands.

The DVC compression framework may further include additional commands beyond those described previously herein. For example, a current pixel may be defined based on a modification of a reference pixel. Such encoding commands are referred to herein as delta encoding commands. Delta encoding commands are generally described in U.S. Pat. Nos. 7,782,961 and 8,660,194, which are incorporated herein by reference in their entirety. As an illustration, a uniform delta encoding command may include a signed color delta associated with an absolute difference between the color values of the current pixel and the reference pixel. As another illustration, a non-uniform delta encoding command may include a signed color delta for each of the color values. It is contemplated herein that delta encoding commands may be less efficient than the copy commands described previously since the inclusion of the color deltas may typically require additional bytes to be transmitted. However, the delta encoding commands may be more efficient than the MAKE_PIXEL (MP) command since the color deltas may be expressed in fewer bits than the full color values and may thus be configured to require fewer bytes. As a result, an implementation of DVC compression utilizing delta commands may generally be more efficient than an implementation without delta commands.

Embodiments of the present disclosure are directed to extensions of DVC compression techniques with delta encoding commands to the YCbCr color space. It is contemplated herein that many video sources are natively encoded in the YCbCr color space due to its inherent compression with minimal perceptive loss. Accordingly, DVC compression in the YCbCr color space may provide increased performance relative to RGB compression schemes. However, it is recognized herein that not all video viewers are capable or well-suited for rendering video in the YCbCr color space. In some embodiments, a DVC video compression system includes a dedicated video viewer on a receiving end of a communication channel to display decoded video.

Some embodiments are directed to DVC compression in the YCbCr color space with a 23-bit color depth. Some embodiments are directed to DVC compression in the YCbCr color space with a 29-bit color depth. Further, some embodiments are directed to DVC compression incorporating chroma sub-sampling (e.g., a 4:2:2 scheme) in which pairs of pixels share chroma values (e.g., CbCr values) but have different luma values (e.g., Y values), and some embodiments are directed to DVC compression allowing odd pixels (e.g., pixels need not be provided in pairs with shared chroma values). Additional embodiments of the present disclosure are directed to extensions of DVC compression techniques with delta encoding commands in the RGB color space with a 23-bit color depth.

Figure 1:
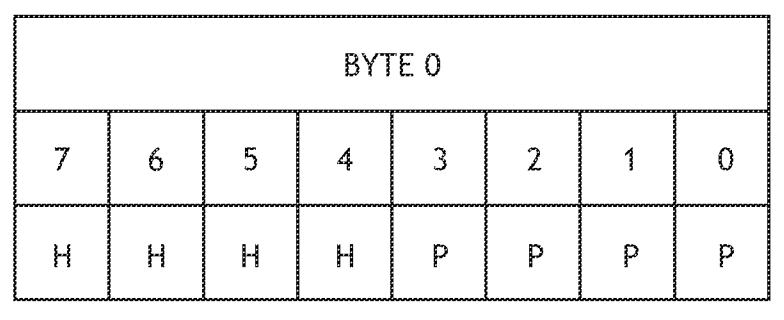

Referring now to FIGS. 1-6, systems and methods for DCV compression are described in greater detail in accordance with one or more embodiments of the present disclosure.

An encoder command may generally include one or more bytes that each include 8 bits, where a selected first number of bits form a header used to identify the encoder command and the remainder of the bits operate as payload bits that may carry associated information associated with the identified command. In cases where an encoder command includes two or more bytes, the additional bytes may include all payload bits. Since each encoder command may be associated with a set byte length, additional header bits may be unnecessary.

FIG. 1 is a conceptual view of a leading (or only) byte of an encoder command with at least one header bit and payload bits, in accordance with one or more embodiments of the present disclosure. In FIG. 1, a byte includes 8 bits (7:0). A leading byte of an encoder command may generally include any number of header bits to identify the encoder command.

In some embodiments, as illustrated in FIG. 1, an encoder command may include four header bits (bits 7:4) depicted with an "H" providing 16 ($2^4$) possible encoder commands. In this configuration, the leading byte may provide 4 payload bits that are depicted with a "P."

In some embodiments, different encoder commands have different numbers of header bits. This may be particularly useful for commands requiring or benefiting from additional payload bits such as, but not limited to, a MAKE_PIXEL (MP) command or a variant thereof. Further, conventions may be established to determine a number of header bits in a particular command such that both a streaming device on both a transmission and communication end may properly encode and decode commands. In some embodiments, commands may have one of a set number of possible header bits, where at least one bit is used at least in part to communicate a number of header bits. For example, a command set may include a command with a single header bit and multiple commands with four header bits. As an illustration, a value of 1 in the first bit (e.g., bit 7) of a leading (or only) byte may indicate a MAKE_PIXEL (MP) command such that the remaining 7 bits may be used as payload bits. In this case, a value of 0 in the first bit may indicate any other type of command, where the following 3 bits (e.g., bits 6:4) are used to identify the particular command. It is to be understood that the above example is provided solely for illustrative purposes and that a variety of schemes in which different encoder commands have different numbers of header bits are within the spirit and scope of the present disclosure.

Referring now to FIGS. 2-5, four DVC command sets are described in greater detail in accordance with one or more embodiments of the present disclosure. FIGS. 2-5 each include columns providing the name of the command set (Comp Type), a mnemonic for each encoder command, a label for each encoder command (Command), a number of bytes associated with each encoder command, and a listing of the values or characteristics of the corresponding bits. Further, in FIGS. 2-5, header bits are depicted with either a "0" or a "1," which are indicative of identifying information for the particular commands, while payload bits are depicted with an alphanumeric sequence with the subscript X is a bit indicator. $R_X$, $G_X$, $B_X$, $Y_X$, $Cr_X$, $Cb_X$ depict R, G, B, Y, Cr, and Cb color values, respectively. $C_X$ is used to depict payload bits for copy commands (e.g., indicating a number of pixels sharing the same properties). Payload bits for delta commands are depicted with the identifier "D" and include variations on the above indicators. $D_X$ is used to depict payload bits for uniform delta commands (e.g., indicating a uniform delta value of a current pixel relative to a reference pixel as defined by the command), $DR_X$, $DG_X$, $DB_X$, $DY_X$, $DCr_X$, $DCb_X$ depict delta color values for R, G, B, Y, Cr, and Cb, respectively. In some cases, a byte identifier is included. For example, Y values for different bytes may depicted in payload bits as $Y_X$, $Y0_X$, $Y1_X$, or the like.

FIG. 2 is a table including commands for a first command set DVC23X listed in order of hierarchal priority, in accordance with one or more embodiments of the present disclosure. The DVC23X command set includes 9 encoder commands and is based on the RGB color space and provides a 23-bit color depth.

The DVC23X command set includes a 3-byte version of a MAKE_PIXEL command (MP23) identified by a value of 1 in the leading bit (7) of the leading byte (Byte 0). In this way, the MP23 command is characterized by a single header bit with the remaining bits in the leading byte (Byte 0) and all bits in the remaining bytes (Bytes 2 and 3) as payload bits. In some embodiments, as illustrated in FIG. 2, the payload bits provide 8 bits to define a red color value ($R_X$), 8 bits to define a green color value ($G_X$), and 7 bits to define a blue color value ($B_X$). It is to be understood, however, that the payload bits may be divided in other ways within the spirit and scope of the present disclosure.

The DVC23X command set further includes 1-byte versions of a COPY_OLD (CO), a COPY_LEFT (CL), and COPY_ABOVE (CA) commands. Each of these include four header bits (7:4) and four payload bits (3:0) for defining a number of sequential pixels sharing the same properties.

The DVC23X command set includes 1-byte versions of Delta Uniform Copy Left (DUCL) and Delta Uniform Copy Above (DUCA) commands. Each of these include four header bits (7:4) and four payload bits (3:0) for defining a signed color delta to be applied uniformly to the referenced pixel (e.g., the left or above pixels, respectively).

The DVC23X command set further includes 2-byte versions of Delta Copy Old (DCO), Delta Copy Left (DCL), and Delta Copy Above (DCA) commands. Each of these includes four header bits in the leading byte (Byte 0), with the remainder of the bits in the leading byte and the remaining bytes (Bytes 2 and 3) as payload bits. In particular, the payload bits may provide 4 bits each to define a signed color delta to be applied to the red, green, and blue color values of the referenced pixel.

FIG. 3 is a table including commands for a second command set DVC23Y2 listed in order of hierarchal priority, in accordance with one or more embodiments of the present disclosure. The DVC23Y2 command set includes 9 encoder commands and is based on the YCbCr color space and provides a 23-bit color depth. Further, the DVC23Y2 command set is designed for chroma sub-sampling in which pixels are paired and in which pixels in each pair share chroma values (e.g., CbCr values) but have different luma values (e.g., Y values). In this way, all encoder commands in DVC23Y2 apply to a pair of pixels.

The DVC23Y2 command set includes a 4-byte version of a MAKE_PIXEL command (MP23ev) identified by a value of 1 in the leading bit (7) of the leading byte (Byte 0). In this way, the MP23ev command is characterized by a single header bit with the remaining bits in the leading byte (Byte 0) and all bits in the remaining bytes (Bytes 1-3) as payload bits. In some embodiments, as illustrated in FIG. 3, the payload bits provide 8 bits to define the Y color value of a first pixel in the pair, 8 bits to define the Cr color value shared by both pixels in the pair, 7 bits to define the Cb color value shared by both pixels in the pair, and 8 bits to define the Y color value of the second pixel in the pair. It is to be understood, however, that the payload bits may be divided in other ways within the spirit and scope of the present disclosure.

The DVC23Y2 command set further includes 1-byte versions of a COPY_OLD (CO), a COPY_LEFT (CL), and COPY_ABOVE (CA) commands. Each of these include four header bits (7:4) and four payload bits (3:0) for defining a number of sequential pixels sharing the same properties.

The DVC23Y2 command set further includes 2-byte versions of Delta Uniform Copy Left (DUCL) and Delta Uniform Copy Above (DUCA) commands. Each of these include four header bits (7:4) in the leading byte (Byte 0), with four payload bits (3:0) in the leading byte and all bits in the second byte as payload bits. In particular, the four payload bits in the leading byte may define a signed color delta to be applied uniformly to the referenced pixel (e.g., the left or above pixels, respectively) to provide the color values of the first pixel in the pixel pair. Further, the 8 bits in the second byte (Byte 1) may separately define Y color values of the second pixel in the pixel pair.

The DVC23Y2 command set further includes 3-byte versions of Delta Copy Old (DCO), Delta Copy Left (DCL), and Delta Copy Above (DCA) commands. Each of these includes four header bits in the leading byte (Byte 0), with the remainder of the bits in the leading byte and the remaining bytes (Bytes 1 and 2) as payload bits. In particular, the payload bits may provide 4 bits each to define a signed color delta to be applied to the Y, Cr, and Cb color values of the referenced pixel to provide the color values of the first pixel in the pair, as well as 8 bits to separately define the Y color values of the second pixel in the pair ($Y1_x$).

FIG. 4 is a table including commands for a third command set DVC23Y listed in order of hierarchal priority, in accordance with one or more embodiments of the present disclosure. The DVC23Y command set includes 10 encoder commands and is based on the YCbCr color space and provides a 23-bit color depth. Further, most of the commands in the DVC23Y command set are designed to individually address each pixel, but still assumes that chroma sub-sampling is present.

The DVC23Y command set includes two variations of a MAKE_PIXEL command. A first 4-byte MAKE_PIXEL command (MP23ev) is identified by a value of 1 in the leading bit (7) of the leading byte (Byte 0) and is equivalent to the MP23ev command in the DVC23Y2 command set above. In this way, the MP23ev command directly sets the color values for both pixels in a pair. A second 1-byte MAKE_PIXEL command (MP23od) is also identified by a value of 1 in the leading bit (7) and includes 7 payload bits (6:0) to define the Y color values for the second pixel. For example, the MP23ev and MP23od commands may be distinguished based on a position of the particular pixel being referenced, where MP23ev may be used for even-numbered pixels and MP23od may be used for odd-numbered pixels. It is to be understood, however, that the payload bits may be divided in other ways within the spirit and scope of the present disclosure.

The DVC23Y command set further includes 1-byte versions of a COPY_OLD (CO), a COPY_LEFT (CL), and COPY_ABOVE (CA) commands. Each of these include four header bits (7:4) and four payload bits (3:0) for defining a number of sequential pixels sharing the same properties.

The DVC23Y command set further includes 1-byte versions of Delta Uniform Copy Left (DUCL) and Delta Uniform Copy Above (DUCA) commands. Each of these include four header bits (7:4) and four payload bits (3:0) for defining a signed color delta to be applied uniformly to the referenced pixel (e.g., the left or above pixels, respectively). In this way, the Delta Uniform commands in DVC23Y describe a single pixel. Subsequent pixels may then be described by separate commands. Further, the Delta Uniform commands may be implemented as positional commands. For example, when describing an even pixel, the signed color delta may be applied to all three color components, whereas the signed color delta may be applied to the Y component only when describing an odd pixel.

The DVC23Y command set further includes 2-byte versions of Delta Copy Old (DCO), Delta Copy Left (DCL), and Delta Copy Above (DCA) commands. Each of these includes four header bits in the leading byte (Byte 0), with the remainder of the bits in the leading byte and the remaining byte (Byte 1) as payload bits. In particular, the payload bits may provide 4 bits each to define a signed color delta to be applied to the Y, Cr, and Cb color values of the referenced pixel. These Delta Copy commands may be used on either even or odd pixels, but DVC23Y may be implemented such that Delta Uniform commands may have a higher priority for odd pixels.

FIG. 5 is a table including commands for a fourth command set DVC29Y listed in order of hierarchal priority, in accordance with one or more embodiments of the present disclosure. The DVC29Y is substantially similar to the DVC23Y command set, but modified to support a 29-bit color depth. In particular, the MP23ev and MP23od of the DVC23Y command set are replaced with MP30ev and MP30od commands. The MP30ev command is a 5-byte command identified by a 1 in the leading bit (7) of the leading byte (Byte 0), where the remaining 7 bits in the leading byte and all bits in the following four bytes (Bytes 1-4) are payload bits. For example, the payload bits may include 10 bits to define the Y color value of a first pixel in the pair, 10 bits to define the Cr color values shared by both pixels in the pair, 9 bits to define the Cb color values shared by both pixels in the pair, and 10 bits to define the Y color value of the second pixel in the pair, where the Cr and Cb color values are retained from the previous pair. The MP30od command is a 2-byte command identified by values of 10 in the leading two bits (7:6) of the leading byte (Byte 0), where the remaining 6 bits in the leading byte and all bits in the following byte (Byte 1) are payload bits. However, since only 10 bits are required to provide the desired sample depth, four of the payload bits are identified as null ("n") and are not used for data. It is noted that the particular placement of the null bits is merely illustrative and not limiting.

FIG. 6 includes a summary of the encoder commands for the four DVC command sets in FIGS. 2-5, in accordance with one or more embodiments of the present disclosure.

Referring now to FIG. 7, FIG. 7 is a block diagram view of a system 700 for streaming compressed video, in accordance with one or more embodiments of the present disclosure. In some embodiments, the system 700 includes two or more streaming devices 702 suitable for at least one of transmitting or receiving compressed video across one or more communication channels 704.

In some embodiments, a streaming device 702 includes a controller 706. In some embodiments, the controller 706 includes one or more processors 708. For example, the one or more processors 708 may be configured to execute a set of program instructions maintained in a memory 710, or memory device. As an illustration, the controller 706 may be configured to execute any combination of the encoder commands for sending and/or receiving a compressed video stream. In some embodiments, the controller 706 of one streaming device 702 transmits a compressed video stream over one or more communication channels 704 including one or more video frames using any combination of encoder commands, where the video frames may be stored locally (e.g., on the memory 710 of the corresponding streaming device 702) or stored remotely (e.g., on a server, or the like). In this configuration, another streaming device 702 may receive the compressed video stream over the one or more communication channels 704. The video stream may then be stored locally (e.g., on the memory 710 of the corresponding streaming device 702) or stored remotely (e.g., on a server, or the like).

The one or more processors 708 of a controller 706 may include any processor or processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), or one or more digital signal processors (DSPs)). In this sense, the one or more processors 708 may include any device configured to execute algorithms and/or instructions (e.g., program instructions stored in memory). In some embodiments, the one or more processors 708 may be embodied as a desktop computer, mainframe computer system, workstation, image computer, parallel processor, networked computer, or any other computer system configured to execute program instructions. Further, the steps described throughout the present disclosure may be carried out by a single controller or, alternatively, multiple controllers. Additionally, the controller 706 may include one or more controllers housed in a common housing or within multiple housings.

The memory 710 may include any storage medium known in the art suitable for storing program instructions executable by the associated one or more processors 708. For example, the memory 710 may include a non-transitory memory medium. By way of another example, the memory 710 may include, but is not limited to, a read-only memory (ROM), a random-access memory (RAM), a magnetic or optical memory device (e.g., disk), a magnetic tape, a solid-state drive and the like. It is further noted that the memory 710 may be housed in a common controller housing with the one or more processors 708. In some embodiments, the memory 710 may be located remotely with respect to the physical location of the one or more processors 708 and the controller 706. For instance, the one or more processors 708 of the controller 706 may access a remote memory (e.g., server), accessible through a network (e.g., internet, intranet and the like).

In some embodiments, a streaming device 702 includes a display device 712. For example, a streaming device 702 may include a display device 712 suitable for displaying a YCbCr video stream. As another example, a streaming device 702 may include a video convert to convert a YCbCr video stream to another color space (e.g., RGB) for display on a display device 712.

Further, although FIG. 7 depicts multiple streaming devices 702 with display devices 712, it is to be understood that this is not a requirement. In some embodiments, no streaming devices include a display device 712. In some embodiments, only a streaming device 702 configured to receive a compressed video stream includes a display device 712.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A video compression system comprising:
   a controller including one or more processors configured to execute program instructions causing the one or more processors to:
   at least one of send or receive a compressed video stream based on encoder commands for sequences of one or more pixels in a video stream from a set of hierarchal encoder commands, wherein the video stream is provided in a YCbCr color space, wherein at least some of the set of hierarchal encoder commands address pairs of the one or more pixels having common chroma values and different luma values, wherein the set of hierarchal encoder commands includes:
   a copy command indicating that a particular sequence of one or more pixels in a video frame of the video stream is identical to a reference pixel, the reference pixel including one of:
   a previous pixel in the video frame;
   a pixel located above a first pixel in the particular sequence in the video frame; or a pixel in a previous video frame of the video stream at a location of the first pixel in the particular sequence;

a delta command indicating that the particular sequence includes a single pixel with color values equal to the reference pixel combined with a signed color delta; and a make pixel command providing color values of the particular sequence.

2. The video compression system of claim 1, wherein the set of hierarchal encoder commands provide 23-bit color depth information for the sequences of one or more pixels.

3. The video compression system of claim 2, wherein the make pixel command is a four byte command including one header bit, wherein a remainder of bits in the make pixel command are payload bits defining separate luma values for a pair of pixels and common chroma values for the pair of pixels.

4. The video compression system of claim 2, wherein the copy command is a one byte command including four header bits, wherein a remainder of bits in the make pixel command are payload bits.

5. The video compression system of claim 2, wherein the delta command is a two byte command with four header bits, wherein a remainder of bits in the delta command are payload bits.

6. The video compression system of claim 2, wherein the delta command is a three byte command with four header bits, wherein a remainder of bits in the delta command are payload bits.

7. The video compression system of claim 2, wherein least some of the set of hierarchal encoder commands address a single pixel.

8. The video compression system of claim 3, wherein the set of hierarchal encoder commands further comprises:

an additional make pixel command that is a one byte command including one header bit, wherein a remainder of bits in the additional make pixel command are payload bits defining a luma value for the single pixel.

9. The video compression system of claim 7, wherein the copy command is a one byte command including four header bits, wherein a remainder of bits in the make pixel command are payload bits.

10. The video compression system of claim 7, wherein the delta command is a one byte command with four header bits, wherein a remainder of bits in the delta command are payload bits to be applied to the single pixel.

11. The video compression system of claim 7, wherein the delta command is a two byte command with four header bits, wherein a remainder of bits in the delta command are payload bits to be applied to the single pixel.

12. The video compression system of claim 1, wherein the encoder commands provide 29-bit color depth information.

13. The video compression system of claim 12, wherein the make pixel command is a five byte command including one header bit, wherein a remainder of bits in the make pixel command are payload bits defining separate luma values for a pair of pixels and common chroma values for the pair of pixels.

14. The video compression system of claim 12, wherein the make pixel command is a one byte command including one header bit, wherein a remainder of bits in the make pixel command are payload bits defining a luma value for a single pixel.

15. The video compression system of claim 12, wherein the copy command is a one byte command including four header bits, wherein a remainder of bits in the make pixel command are payload bits.

16. The video compression system of claim 12, wherein the delta command is a one byte command with four header bits, wherein a remainder of bits in the delta command are payload bits.

17. The video compression system of claim 12, wherein the delta command is a two byte command with four header bits, wherein a remainder of bits in the delta command are payload bits.

18. A video compression method comprising:

providing encoder commands for sequences of one or more pixels in a video stream from a set of hierarchal encoder commands, wherein the video stream is provided in a YCbCr color space, wherein at least some of the set of hierarchal encoder commands address pairs of the one or more pixels having common chroma values and different luma values, wherein the set of hierarchal encoder commands includes:

a copy command indicating that a particular sequence of one or more pixels in a video frame of the video stream is identical to a reference pixel, the reference pixel including one of:

a previous pixel in a video frame;

a pixel located above a first pixel in the particular sequence in the video frame; or a pixel in a previous video frame of the video stream at a location of the first pixel in the particular sequence;

a delta command indicating that the particular sequence includes a single pixel with color values equal to the reference pixel combined with a signed color delta; and a make pixel command providing color values of particular sequence; and transmitting the encoder commands for each of the sequences of one or more pixels in the video stream over a communication channel upon generation.

19. A video compression system comprising:

a controller including one or more processors configured to execute program instructions causing the one or more processors to:

at least one of send or receive a compressed video stream based on encoder commands for sequences of one or more pixels in a video stream from a set of hierarchal encoder commands, wherein the video stream is provided in a RGB color space with a 23-bit color depth, wherein the set of hierarchal encoder commands includes:

a copy command indicating that a particular sequence of one or more pixels in a video frame of the video stream is identical to a reference pixel, the reference pixel including one of:

a previous pixel in the video frame;

a pixel located above a first pixel in the particular sequence in the video frame; or a pixel in a previous video frame of the video stream at a location of the first pixel in the particular sequence;

a delta command indicating that the particular sequence includes a single pixel with color values equal to the reference pixel in the video frame combined with a signed color delta; and a make pixel command providing color values of the particular sequence.

20. The video compression system of claim 19, wherein the make pixel command is a three byte command including one header bit, wherein a remainder of bits in the make pixel command are payload bits defining red, green, and blue color values of the one or more pixel values of the particular sequence.

21. The video compression system of claim 19, wherein the copy command is a one byte command including four header bits, wherein a remainder of bits in the copy command are payload bits.

22. The video compression system of claim 19, wherein the delta command is a one byte command with four header bits, wherein a remainder of bits in the delta command are payload bits including the signed color delta, wherein the signed color delta is applied uniformly to red, green, and blue color values of the one or more pixels in the particular sequence.

23. The video compression system of claim 19, wherein the delta command is a two byte command with four header bits, wherein a remainder of bits in the delta command are payload bits including the signed color delta, wherein the signed color delta provides four bits to be applied to red color values of the one or more pixels in the particular sequence, four bits to be applied to green color values of the one or more pixels in the particular sequence, and four bits to be applied to blue color values of the one or more pixels in the particular sequence.

24. The video compression system of claim 7, wherein the set of hierarchal commands further comprises:
an additional delta command with a lower priority than the delta command, wherein the additional delta command is a two byte command with four header bits, wherein a remainder of bits in the delta command are payload bits.

25. The video compression system of claim 16, wherein the set of hierarchal commands further comprises:
an additional delta command with a lower priority than the delta command, wherein the additional delta command is a two byte command with four header bits, wherein a remainder of bits in the delta command are payload bits.

* * * * *